(12) United States Patent
Brand (10) Patent No.: US 11,392,105 B2
(45) Date of Patent: Jul. 19, 2022

(54) SYSTEM AND METHOD FOR GENERATING OPTIMAL LATTICE TOOL PATHS

(71) Applicant: Mitsubishi Electric Research Laboratories, Inc., Cambridge, MA (US)

(72) Inventor: Matthew Brand, Newton, MA (US)

(73) Assignee: Mitsubishi Electric Research Laboratories, Inc.

(*) Notice: Subject to any disclaimer, the term of this patent is extended or adjusted under 35 U.S.C. 154(b) by 221 days.

(21) Appl. No.: 16/368,148

(22) Filed: Mar. 28, 2019

(65) Prior Publication Data
US 2020/0310382 A1 Oct. 1, 2020

(51) Int. Cl.
G05B 19/408 (2006.01)
G05B 19/25 (2006.01)
G05B 19/4093 (2006.01)
G05B 19/4155 (2006.01)
G05B 19/4103 (2006.01)
G05B 19/4097 (2006.01)

(52) U.S. Cl.
CPC ........ *G05B 19/408* (2013.01); *G05B 19/25* (2013.01); *G05B 19/4097* (2013.01); *G05B 19/40938* (2013.01); *G05B 19/4103* (2013.01); *G05B 19/4155* (2013.01)

(58) Field of Classification Search
CPC ............ G05B 19/25; G05B 19/408; G05B 19/40938; G05B 19/4097; G05B 19/4103; G05B 19/4155
USPC ........................................... 700/189
See application file for complete search history.

(56) References Cited

U.S. PATENT DOCUMENTS

| | | | | |
|---|---|---|---|---|
| 5,943,056 A | * | 8/1999 | Sato | G06T 17/00 345/419 |
| 2011/0190922 A1 | * | 8/2011 | Walker | B24B 13/06 700/118 |

OTHER PUBLICATIONS

Erkorkmaz, Kaan. "High speed contouring control for machine tool drives." PhD diss., University of British Columbia, 1999; pp. 49-51 (Year: 1999).*

* cited by examiner

*Primary Examiner* — Mohammad Ali
*Assistant Examiner* — Joshua T Sanders
(74) *Attorney, Agent, or Firm* — Gennadiy Vinokur; Hironori Tsukamoto (57) ABSTRACT

A data conversion system includes an interface to receive path data, a memory to store a computer-executable program including a lattice full algorithm and a dynamic programming algorithm, a processor, in connection with the memory, configured to execute the computer-executable program. The processor is configured to perform steps including providing a coordinate system including admissible points, forming, from the path data, a target polyline on the coordinate system, wherein the target polyline represents an approximated surface line of an object, dividing the target polyline into line segments, generating a set of rational vectors by approximating slopes of the line segments based on the lattice full algorithm, arranging the rational vectors to form lower convex hull lines arranged on or above corresponding line segments, wherein the lower convex hull lines are arranged onto the admissible points, wherein the admissible points are on or above the corresponding line segments, selecting a set of endpoints of the lower convex hull lines, and forming a final polyline by merging the endpoints based on the dynamic programming algorithm, wherein the final polyline is arranged to lay on or above the target polyline.

22 Claims, 7 Drawing Sheets

SYSTEM AND METHOD FOR GENERATING OPTIMAL LATTICE TOOL PATHS

FIELD OF THE INVENTION

The present disclosure relates generally to a path generation system for numerically controlled machines, more specifically to a tool path generation system for precision machining of surfaces.

BACKGROUND OF THE INVENTION

In a computer-aided manufacturing (CAM) system for numerical-control (NC)/computer-numerical control (CNC) machines, candidate tool positions are a very sparse sample of the space of possible tool positions, they are represented in high-precision floating point coordinates, and special computing strategies are needed to make the dynamic program practical, such as graphics processing units (GPUs), point dropping, approximate curve fitting. An example can be found in [US20120265331A1 "Five-axis flank milling system for machining curved surface and the tool-path planning method thereof" and related paper by Ping-Han Wu, Yu-Wei Li, Chih-Hsing Chu, "Optimized tool path generation based on dynamic programming for five-axis flank milling of rule surface" International Journal of Machine Tools and Manufacture, Volume 48, Issue 11, September 2008, Pages 1224-1233]. Consequently, the result is suboptimal and the method is often impractically slow.

Some methods aim to resample and smooth the path by limiting velocity, acceleration, and jerk to a ranges in which the tool can be expected to smoothly machine the surface. For example, see [Xiao Fei Bu, Hu Lin, Liao Mo Zheng, and Han Zhang, "Small Line Segment Interpolation Algorithm for Smoothing Machining", Advanced Materials Research, Volume 842, 2014, pages 420-426] and [Hichem Bouchenitfa, Julien Chaves-Jacob, Jean-Marc Linares, Jean-Michel Sprauel, Noureddine Azzam, and Salim Boukebbab, "Improvement of toolpath quality combining polynomial interpolation with reduction of toolpath points" International Journal of Advanced Manufacturing Technology, Volume 78, 2015, pages 875-883]. These methods prioritize smooth tool motion over fidelity to the target surface, and can (incorrectly) reject high-curvature parts of a CAD model as defects. Accordingly, there is a need to develop a novel data processing (system) to solve the above problems.

SUMMARY OF THE INVENTION

The present disclosure relates to systems and methods for path generation system for numerically controlled machines. The present disclosure includes examples that optimally guide a machine-positioned tool along a surface of a workpiece.

Some embodiments of the present disclosure show that: (1) Regardless of machining strategy, the artifact-minimizing tool path is the one that conforms as tightly as possible to the target surface without gouging it. (2) Whereas the target surface may be defined via continuous mathematical curves, the computer numerically controlled machines can only move to discrete lattice coordinates, none of which may coincide with the surface. (3) The best-conforming path though discrete coordinates can be obtained by "brute force" dynamic programming (DP) over all possible coordinates in the workspace, but the brute force DP problem is too large to be computed in a practical amount of time or with practical computing resources. (4) The optimal path can also be calculated by identifying a small subset of "admissible" lattice coordinates via Diophantine approximations and chaining these together in a small dynamic program whose solution requires modest computing resources.

In a practical contour-milling task, such optimal tool paths were found to reduce tool path error by 2 orders of magnitude (compared to the output of commercial CAM system), yielding substantial improvements in the quality of the machined surface.

According, the present invention can substantially reduce the tool path error and the computational load and be improvements in computer functionality and improvements in an existing technology regarding computer implementation.

According to embodiments of the present invention, a data conversion system includes an interface to receive path data; a memory to store a computer-executable program including a lattice full algorithm and a dynamic programming algorithm; a processor, in connection with the memory, configured to execute the computer-executable program. In this case, the program causes the processor to perform steps that include providing a coordinate system including admissible points; forming, from the path data, a target polyline on the coordinate system, wherein the target polyline represents an approximated surface line of an object; dividing the target polyline into line segments; generating a set of rational vectors by approximating slopes of the line segments based on the lattice full algorithm; arranging the rational vectors to form lower convex hull lines arranged on or above corresponding line segments, wherein the lower convex hull lines are arranged onto the admissible points, wherein the admissible points are on or above the corresponding line segments; selecting a set of endpoints of the lower convex hull lines; and forming a final polyline by merging the endpoints based on the dynamic programming algorithm, wherein the final polyline is arranged to lay on or above the target polyline.

Further, some embodiments of the present invention are based on recognition about a computer-implemented method for a data conversion. In this case, the computer-implemented method includes receiving path data; providing a coordinate system including admissible points; forming, from the path data, a target polyline on the coordinate system, wherein the target polyline represents an approximated surface line of an object; dividing the target polyline into line segments; generating a set of rational vectors by approximating slopes of the line segments based on a lattice full algorithm; arranging the rational vectors to form lower convex hull lines arranged on or above corresponding line segments, wherein the lower convex hull lines are arranged onto the admissible points, wherein the admissible points are on or above the corresponding line segments; selecting a set of endpoints of the lower convex hull lines; and forming a final polyline by merging the endpoints based on a dynamic programming algorithm, wherein the final polyline is arranged to lay on or above the target polyline.

Further, since a data conversion system and a computer-implemented method for a data conversion according to embodiments of the present invention provide special computing strategies for determining candidate tool positions, the data conversion system and the computer-implemented method of the present invention may reduce central processing unit (CPU) usage, power consumption, and/or network bandwidths.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Accordingly, some embodiments of the present disclosure can reduce a power consumption of a computer (processor) and improve the functions of a computational system.

In some embodiments of the present disclosure, the system can be effectively and accurately performed with less time and less computing power, thus the use of a method or system described in the present disclosure can reduce central processing unit usage and power consumption.

A computer-aided manufacturing (CAM) system is used to control machine tools of a numerical control (CNC) machine (or referred to as a numerical control (NC) machine). The CNC machine performs manufacturing processes for a workpiece of material, such as metal, plastic, wood ceramic, composite materials. The machine tools include drills, boring tools, lathes, and milling tools. For instance, a contour milling process is used for shaping the surface of a workpiece according to code data generated and transmitted by the CAM system.

The contour milling process is required to minimize undercuts (excess) with no overcuts (gouges), since the gouges are unrepairable, while undercuts can be polished out when finishing the surface of the workpiece. In general, the contouring path of a product is generated by a computer-aided machining (CAM) system that can specify positions of tool with approximately 8 to 16 digits precision. However, inside the CNC machine, the workspace is typically addressed with only 4 to 6 digits precision. Accordingly, losses of the precisions take place and result in surface errors and artifacts on the finished surface of the workpiece after the shaping process.

Some machine control systems provide a look-ahead process to smooth out infeasible or vibration-inducing accelerations in the motion of the tool. This smoothing reduces artifacts due to machine flexure, but it generally makes the tool path less faithful to the designed surface. Furthermore, the look-ahead has little effect in contouring and finishing passes, because to tool is already moving slowly.

In a standard machining process, a CAM system generates poly line tool paths on the surface of a workpiece based on very high precision CAD data (design data) provided by a CAD system. A poly line is a sequence of line segments defined on a sequence of waypoints. Typically, the CAM system computes the waypoints with very high precision but them rounds them to lower precision because the CNC machine will ignore or choke on the extra digits of precision.

This rounding has been observed to produce anisotropic machining artifacts on the finished surface of the workpiece.

Inside most CNC machines, the motion controller is designed to provide high-quality linear interpolation between waypoints that are specified in the internal coordinate system which is discrete. At present, there is a robust market for machines that provide as little as 50 discrete positions per inch.

One of the main concerns in contour machining is minimizing measures of surface error such as surface roughness. An overlooked cause of surface errors is the fact that the machine's internal coordinate system is orders of magnitude coarser than the coordinate system used to specify the target surface in the CAD model. The internal coordinate system can be regarded as a lattice of discrete points; the machine is capable of straight-straight-line motion between lattice points but cannot navigate to or from off-lattice points. This necessitates rounding coordinates at some point in the fabrication process; this rounding becomes a source of error in the tool motion and in the finished workpiece. That error is highly correlated along the tool path and mostly uncorrelated across adjacent passes of the tool, which creates anisotropic texture artifacts on the surface.

The present invention shows how to convert a higher-precision path from the CAM system into an optimal set of waypoints in the machine's lower-precision internal coordinate system. Here optimal means that the tool motion conforms as tightly as possible to the surface without gouging it. In particular, this invention provides a new optimal tool path generation method wherein use of Diophantine geometry makes it practical to globally optimize over all possible machine-internal coordinates. This results in significantly better conforming paths than the current state of the art, which considers a relatively small number of points sampled from the surface. When used in contour milling, the new method has been observed to reduce workpiece surface roughness to levels below the machine's rated positioning accuracy.

Figure 1A:
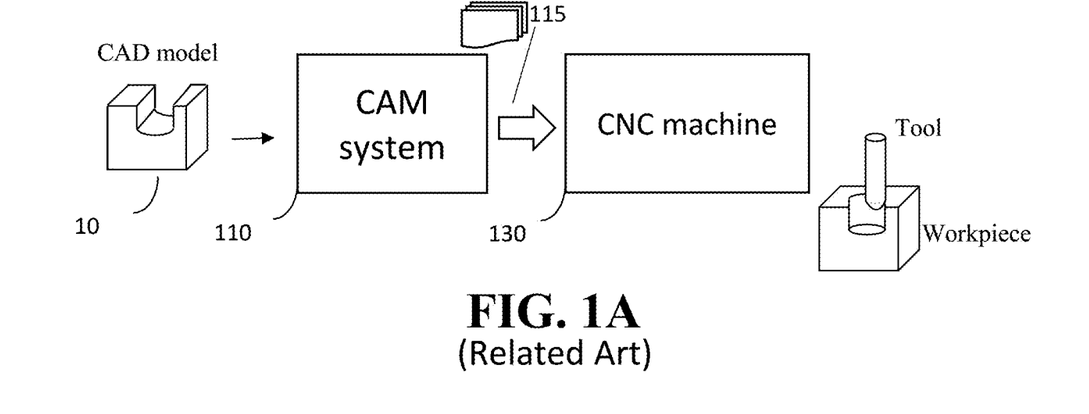
FIG. 1A shows a data processing flow from a CAD system to a CNC machine via a CAM system, according to a related art.

FIG. 1A shows a data flow from a CAD system (not shown) to a CNC machine 130 via a CAM system 110 according to a related art. The CAM system 110 receives CAD model data 10 from the CAD system and generates and control code 115 based on the CAD model data 10 and transmits the control code 115 to the CNC machine 130 to control a machine tool of the CNC machine 130 so that the CNC machine 130 manufacturers a product from a workpiece according to the control-code 115 of the CAM 130. The control code 115 provides a sequence of workpiece or workspace coordinates that are used to specify tool paths of the tool of the CNC machine 130. The control code 115 can be referred to as a numerical control (NC) program language, typically G-code or RS-274.

In the following, identical numbers are used to parts having similar functions in the figures.

Figure 1B:
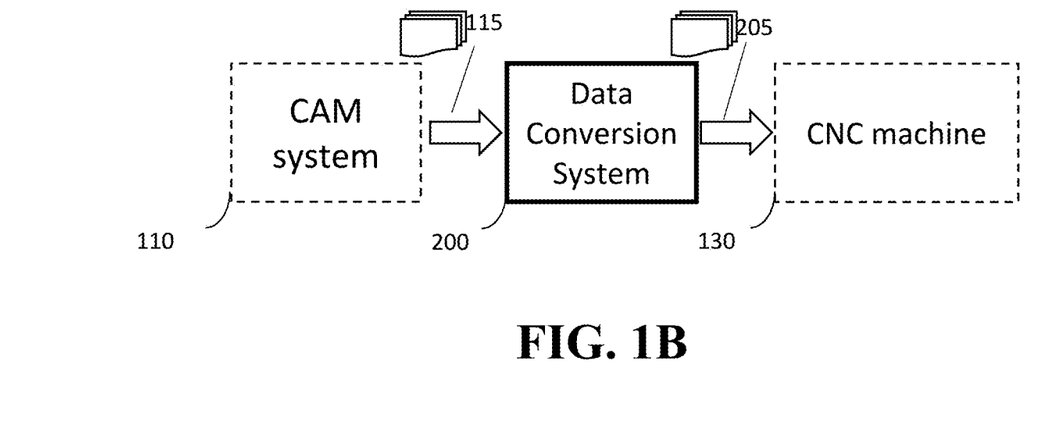
FIG. 1B shows a data conversion system arranged between a CAM system and a CNC machine, according to embodiments of the present invention.

FIG. 1B is a schematic diagram illustrating a data conversion system 200 according to some embodiments of the present invention. For instance, the data conversion system 200 can be arranged between the CAM system 110 and the CNC machine 130. After receiving the control code 115 from the CAM system 110, the data conversion system 200 converts the control code 115 into a converted control code 205 that provides second toolpath coordinates used by the CNC machine 130. Further, the converted control code 205 is transmitted to the CNC machine 130 via an interface of the data conversion system 200.

Figure 2:
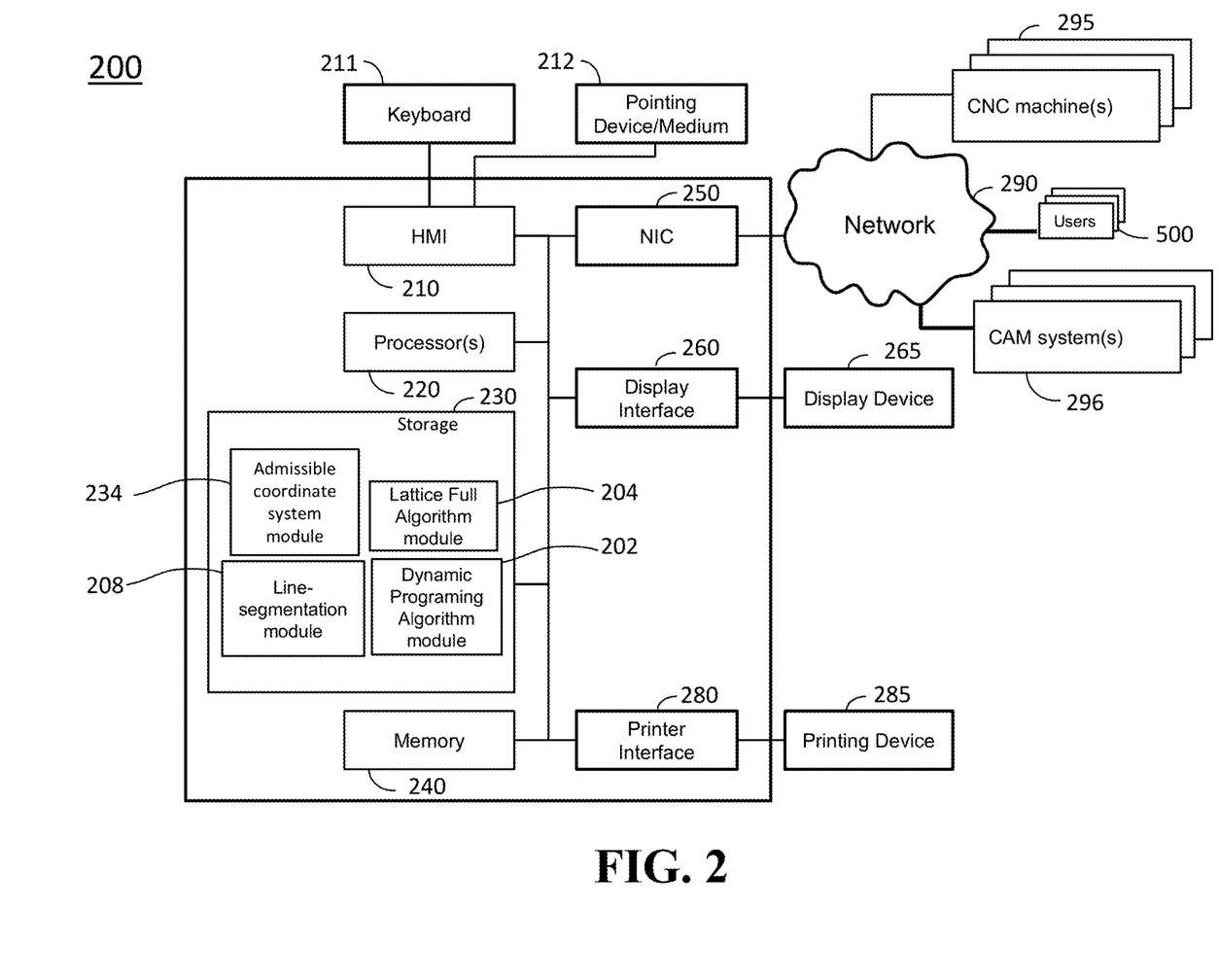
FIG. 2 shows a data conversion system adaptable for CAM and CNC systems, according to embodiments of the present invention.

A configuration of the data conversion system 200 is exemplary illustrated in FIG. 2. The explanations regarding FIG. 2 will be made later.

Figure 1C:
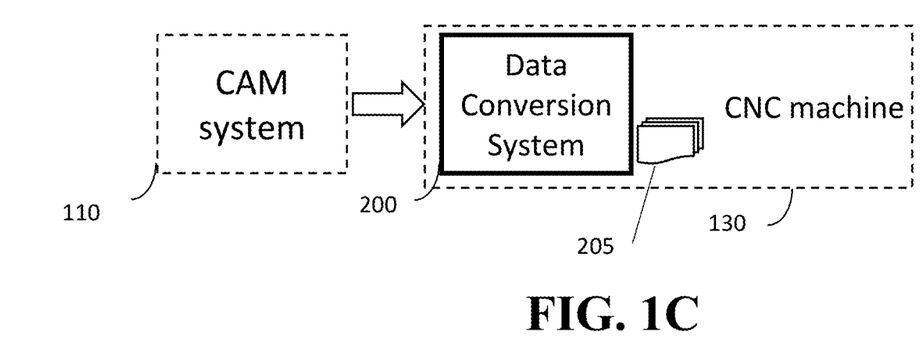
FIG. 1C shows a data conversion system arranged in a CNC machine receiving data from a CAD system, according to embodiments of the present invention.

It should be noted that there are variations of arrangements of the data conversion system 200 with the CAM system 110 and CNC machine 130. FIG. 1C shows another configuration illustrating that the data conversion system 200 is included in a CNC machine 130. For instance, the data conversion system 200 may be installed as part of the CNC machine 130. As the interface can be connected to the CAM system via data lines or wireless communications or via a network including wireless network, the control code 115 of the CAM system 110 can be received by the data conversion system 200 and converted into the converted control code 205. The converted control code 205 is transferred and used in the CNC machine 130.

Further, the data conversion process performed in the data conversion system 200 can be stored as a computer-executable data conversion program in a storage or memory (not shown) of the CNC machine 130. The computer-executable data conversion program is performed by the processor (not shown) of the CNC machine 130 in connection with the memory or storage, so that the CAM data 115 of the CAM system 110 is converted into the converted control code 205 by use of the processor (or processors) of the CNC machine 130 according to the computer-executable data conversion program of the data conversion system 200.

Figure 1D:
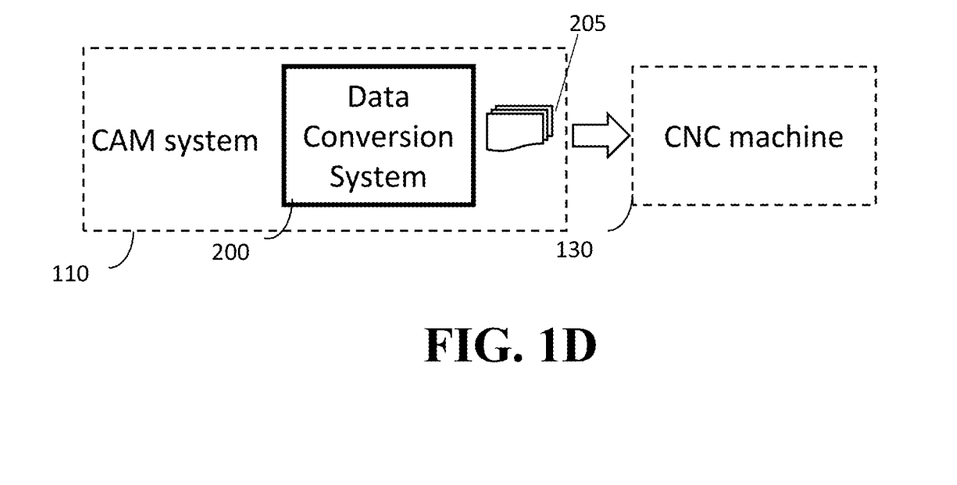
FIG. 1D shows a data conversion system arranged in a CAM system transmitting data to a CNC machine, according to embodiments of the present invention.

Further, FIG. 1D shows another configuration illustrating that the data conversion system 200 is included in a CAM system 110. For instance, the data conversion system 200 may be installed as part of the CAM system 110. As the interface of the data conversion system 200 can be connected to the CNC machine 130 via data lines or wireless communications or via a network including wireless network, the control code 115 of the CAM system 110 can be transmitted to the data conversion system 200 and converted into the converted control code 205. The converted control code 205 is transmitted to via the data lines or wireless communications or via the network, and the converted control code 205 can be used in the CNC machine 130 to control the tool of the CNC machine 130.

Further, the data conversion process performed in the data conversion system 200 can be stored as a computer-executable data conversion program in a storage or memory (not shown) of the CAM system 110. The computer-executable data conversion program is performed by the processor (not shown) of the CAM system 110 in connection with the memory or storage, so that the CAM data 115 is efficiently converted into the converted control code 205 by use of the processor (or processors) of the CAM system 110 according to the computer-executable data conversion program used in the data conversion system 200.

FIG. 2 shows a block diagram of a data conversion system 200 according to some embodiments of the present disclosure. The system 200 may include a human machine interface (HMI) 210 connectable with a keyboard 211 and a pointing device/medium 212, one or more processors 220, a storage device 230, a memory 240, a network interface controller 250 (NIC) connectable with a network 290 including local area networks, wireless networks and internet network, a display interface 260 connected to a display device 265, a printer interface 280 connectable with a printing device 285. In the following, the one or more processors 220 may be referred to as a processor 220 for convenience.

The memory 240 may be one or more memory units, operating with the storage 230 that stores computer executable programs (algorithm codes) in connection with the processor 220. The system 200 may receive input data including CAM data file (not shown) from user(s) 500, CAM data from CAM system(s) 295 via the network 290 connected to the NIC 250. The NIC 250 includes a receiver and transmitter to connect to the network 290 via wired-networks and via wireless-networks (not shown). When the system 200 receives the input data, the system 200 provide an admissible coordinate system from an admissible coordinate system module 234 stored in the storage 230, and performs a lattice full algorithm 204 and dynamic programming algorithm module 202, or a line-segmentation module 208, by using the processor 220 and the memory 240.

Further, the system 200 can communicate with a CAM system(s) 296 and CNC machine(s) via the network 290. After generating tool path data (not shown) from the input data, the system 200 transmits the tool path data to the CNC machine(s) 295.

In some cases, the computer-executable data conversion program stored in the CNC machine 130 or the CAM system 110 may include an admissible coordinate system module 234, a line-segmentation module 208, a lattice full algorithm 204 and a dynamic programming algorithm module 202.

Figure 3:
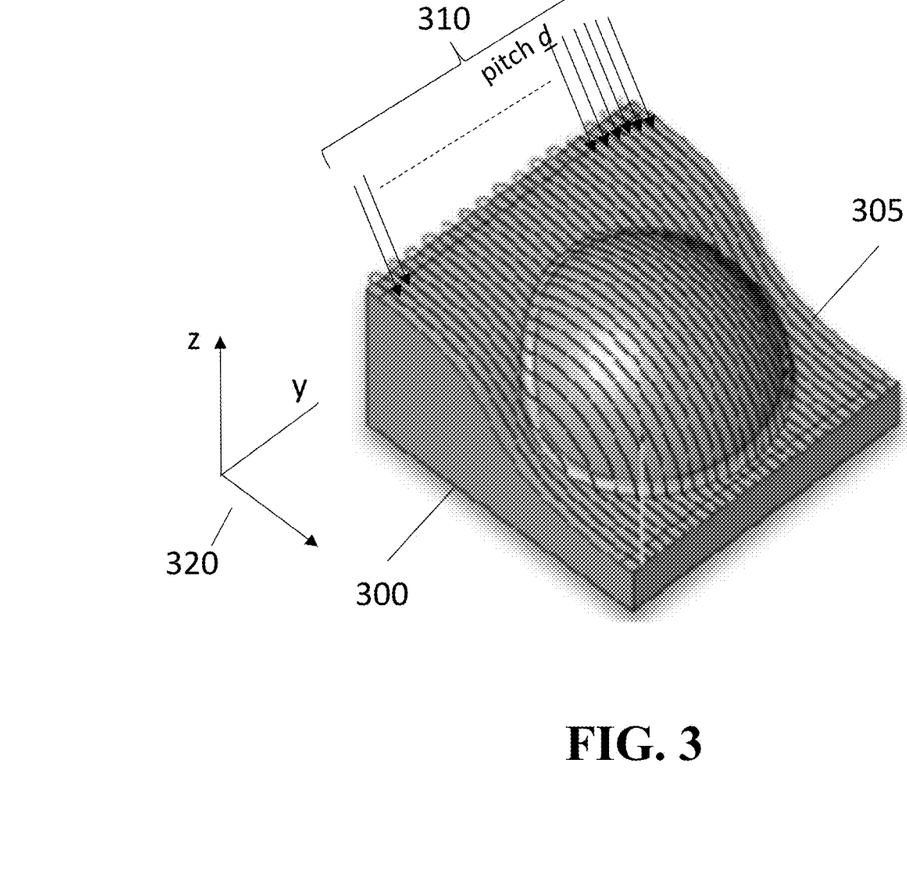
FIG. 3 shows a CAM path for contouring a surface, according to embodiments of the present invention.

FIG. 3 is an example illustrating a designed shape of a workpiece 300 with a contour milling tool path 305 of a contour milling process of the CNC machine 130, according to some embodiments of the present invention. The toolpath 305 is a typically a poly line consisting of a sequence of coordinates joined by line segments. The coordinates are typically defined in a workpiece or workspace coordinate system 320, which has far less precision than the CAD or CAM coordinate systems, and sometimes more precision than the motion controller's internal coordinate system. The toolpath 305 is typically composed of several parallel passes 310 that are separated by pitches determined by the CAM system 130.

According to embodiments of the present invention, each pass of the tool path 305 will be specified in a high precision coordinate system and optimally converted to a sequence of points in the motion controller's internal coordinate system.

Figure 4:
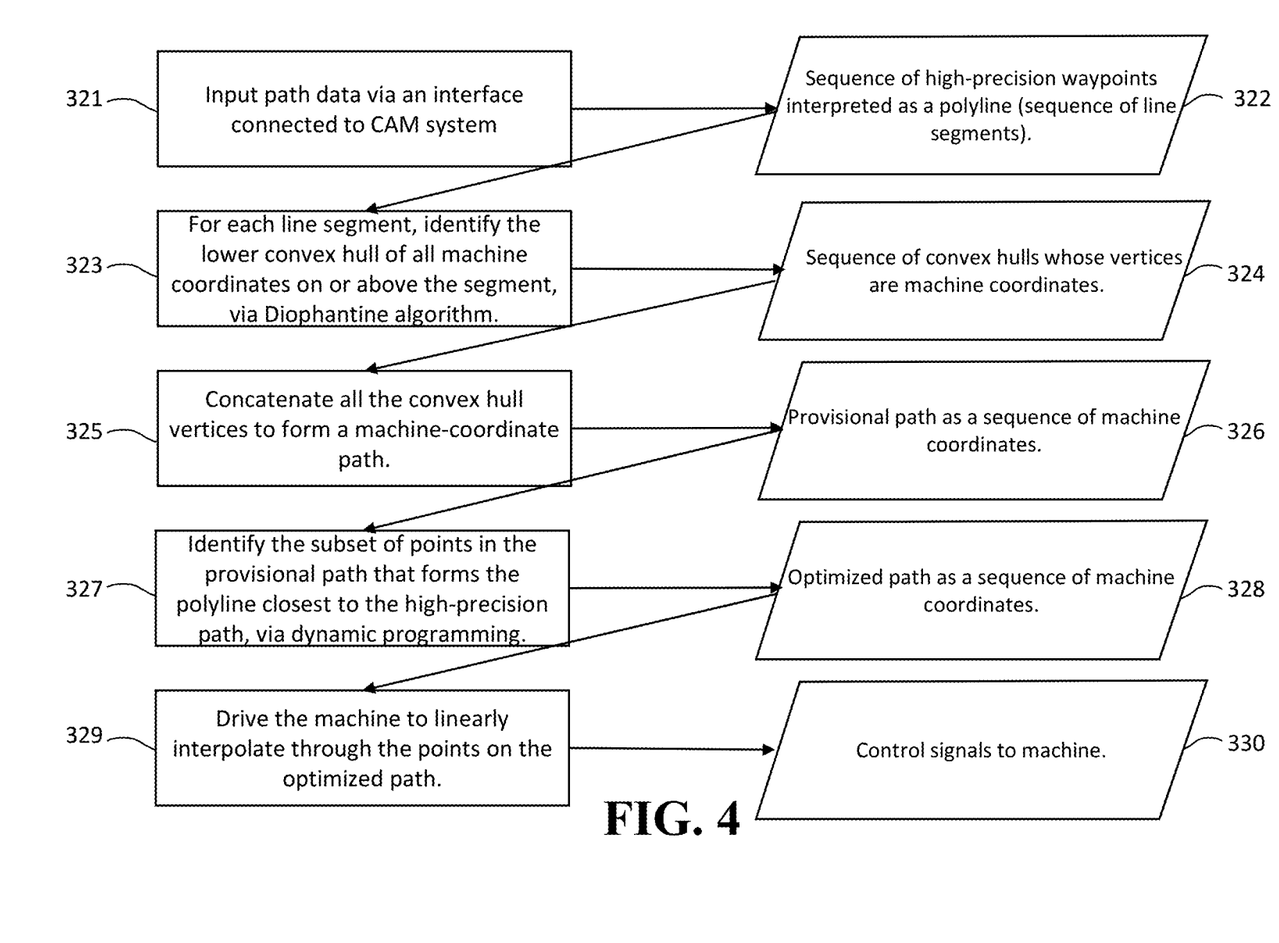
FIG. 4 shows a flowchart for describing the data conversion process, according to embodiments of the present invention.
Figure 5:
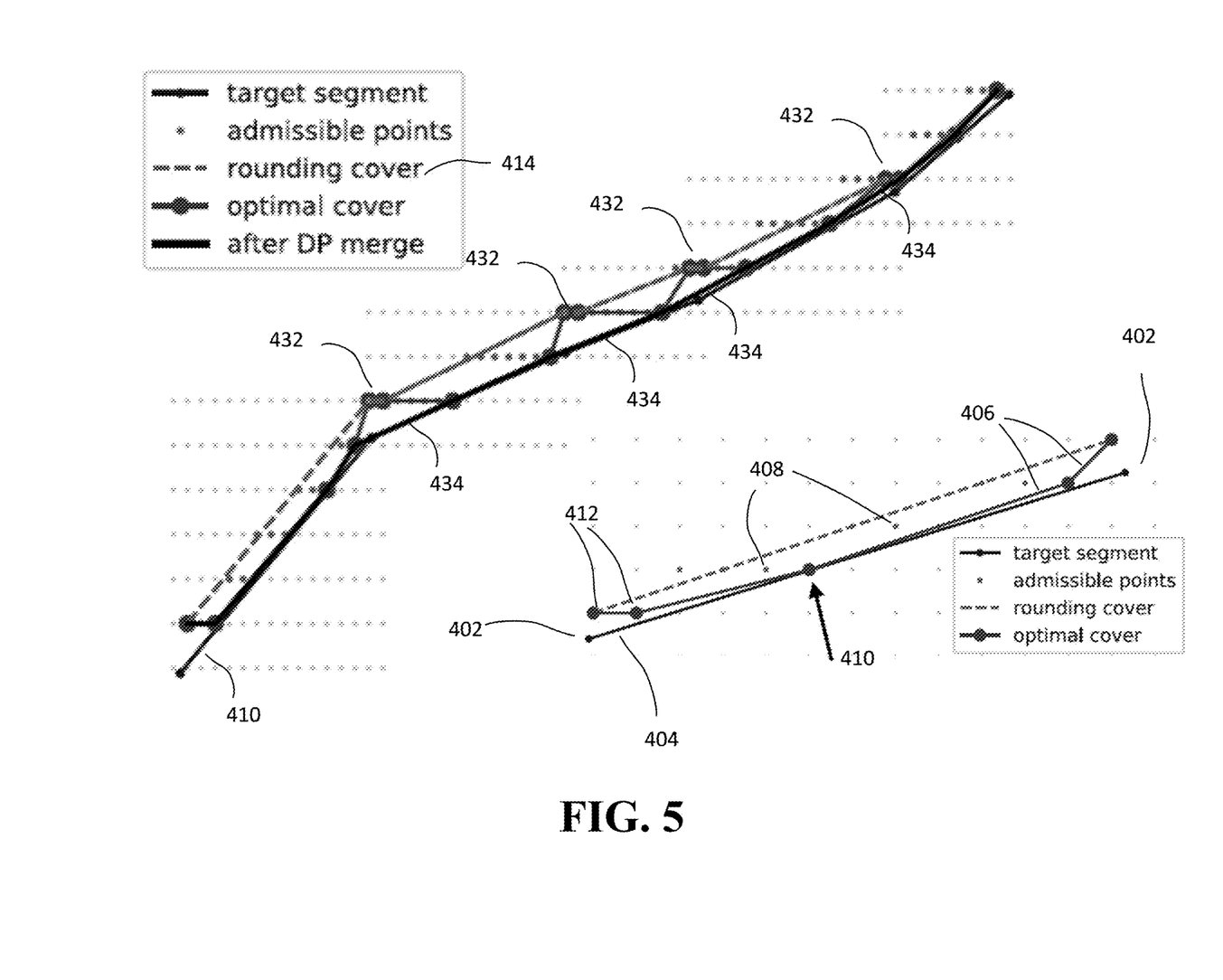
FIG. 5 illustrates stages in the conversion of a high resolution CAM path to an optimized machine coordinate path, according to embodiments of the present invention.

FIG. 4 shows a flowchart indicating the data conversion process, according to embodiments of the present invention. FIG. 5 also illustrates stages in the conversion of a high resolution CAM path to an optimized machine coordinate path, according to embodiments of the present invention. In the following, a data conversion procedure (method) used in the data conversion system 200 is described by referring FIG. 4 in association with FIG. 5.

Each pass of the toolpath 305 can determined by the data conversion system 200 according to the data process described in FIG. 4 flowchart.

The data conversion system 200 obtains 321 obtaining high-precision CAM toolpath data 322 via the NIC 250 and the network 290. This data 322 is a sequence of high-precision points forming a polyline of line segments. The processor 220 examines the line segment 404 between each pair successive waypoints 402 and identifies 323 the lower convex hull 406 of all admissible points 408 that that lie on 410 or above the line segment. An admissible point 408 is an internal machine lattice coordinate that lies directly on 410 or above the high-precision line segment 404. The convex hull 406 is itself a polyline whose vertices 412 are a subset of the admissible points 408. An important property of the convex hull 406 is that there are no internal machine coordinates between it and the high-precision line segment 404. Therefore, the convex hull 406 is an optimal cover of the high-precision line segment 404. The convex hull 406 is always closer to the high-precision line segment 404 than standard practice 414, which is to move the tool along the lowest line segment whose endpoints are the extremal machine coordinates on or above the high-precision line segment 404.

The standard practice 414, referred to in FIG. 5 as the rounding cover, produces toolpaths whose average excess (undercut) is ½ a machine precision unit; the variance of this error is 1/12 a machine precision unit.

A feature of the present invention is a method for determining the lower convex hull 406 without looking at all the admissible points: Start with two rational slopes p=0/1 and q=1/0, and two anchor points, which are initially the two extremal admissible points. Then iterate as follows: From the current anchor points, draw straight lines toward the high-precision line segment 404, with slopes p and q, respectively. If such a line passes through an admissible point before crossing the line segment, the last such point is added to the convex hull and becomes a new anchor point. Then calculate median m=(a+c)/(b+d) from p=a/b and q=c/d. If the mediant m is less than the slope of the high-precision line segment 404, set p=m, else set q=m. Repeating this procedure is guaranteed to generate the lower convex hull 408 in $O(\log L)$ iterations, where L is the number of admissible points above the high-precision line segment 404. Number theorists will recognize that this procedure is closely related to the Diophantine approximation of irrational numbers.

Once hulls are determined 323 for all high-precision line segments, they are concatenated 325 and 432 so that their vertices 324 form a provisional machine-coordinate polyline 326 that is strictly on or above the high-precision polyline.

It is possible that there are straight-line shortcuts 434 between some of the non-successive vertices in the provisional machine-coordinate polyline 326 that come even closer to the original high precision polyline without crossing it. Determining the optimal set of non-gouging shortcuts can be posed as a minimum-cost path problem and solved via dynamic programming 327. The dynamic program identifies a subset of the vertices in the provisional path that comprise the optimally conforming polyline path 328, referred to as the "DP merge" in FIG. 5. After that, a (process) step 329 that drives the machine to linearly interpolate through the points on the optimized path and a (process) step 330 that transmits control signals to the machine 295 are followed.

Figure 6:
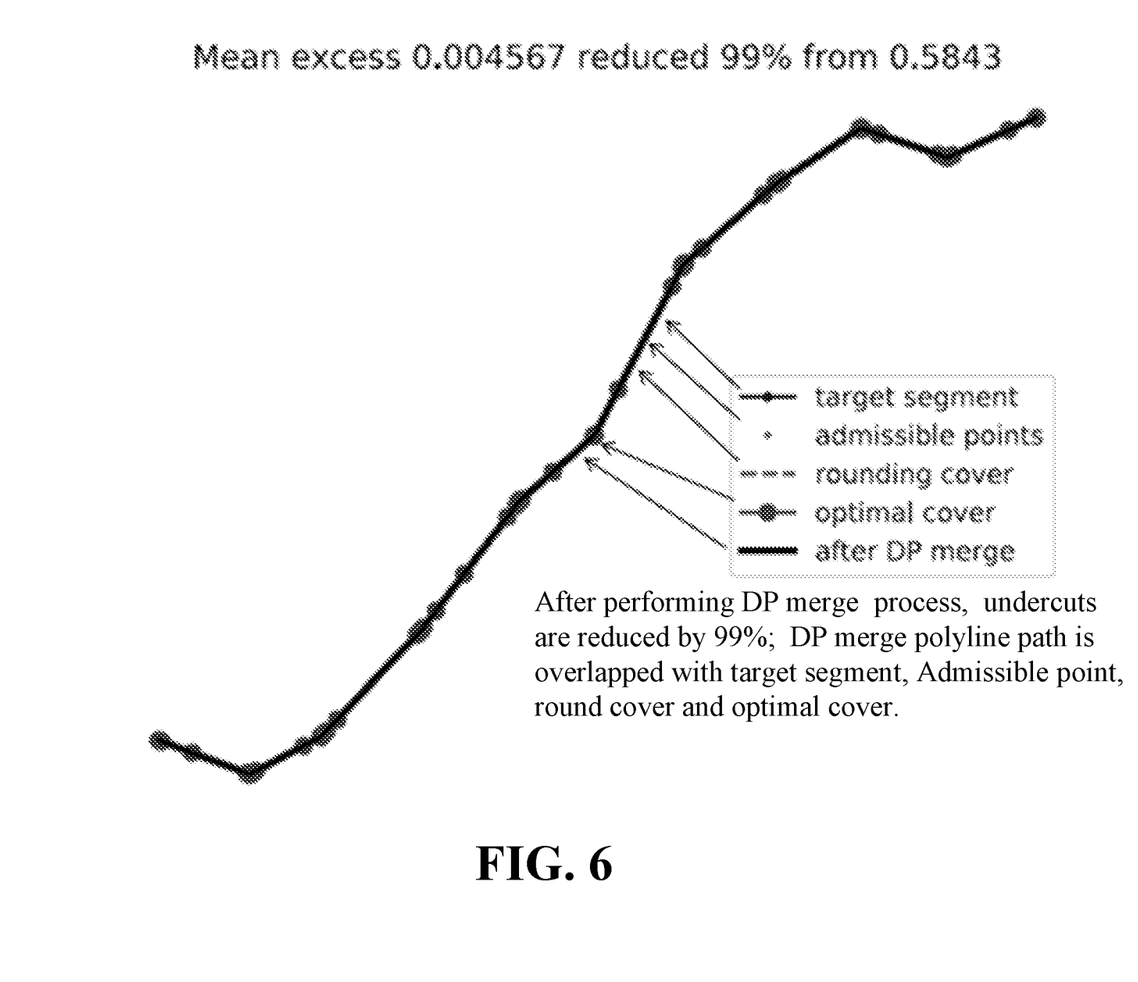
FIG. 6 is an example illustrating a typical case where the data conversion process becomes increasingly precise as the path length grows, according to embodiments of the present invention.

Then end result is a machine-coordinate path that conforms much more closely to the surface than is possible by rounding or truncating away the extra digits of precision in the original CAM path. FIG. 6 illustrates a typical case where the present invention reduces excess (undercuts) by more than 99%, compared to standard practice, without any gouging (overcuts). Reducing the average excess by two orders of magnitude reduces the variance of the excess by four orders of magnitude; this significantly reduces unwanted surface artifacts and textures on the finished piece, producing a much smoother surface.

It is important to note that restricting the minimum-cost path problem to vertices taken from the convex hulls is necessary for making the dynamic program computationally practical, and sufficient for making the resulting path optimally conforming. Without the restriction to hull vertices, the dynamic program would require $O(N^3)$ time, where N is the number of admissible coordinates above the entire high-precision path, often millions. In the present invention, the dynamic program requires only $O(N \log^2 N)$ time, and it can be solved incrementally while the machine is moving.

It should also be noted that when the computer-executable data conversion program stored in the data conversion system 200 is performed in the CNC machine 130 or in the CAM system 110, the data conversion process can be identical to that performed in the data conversion system 200.

According to some embodiments of the present invention, the computational steps can remarkably be reduced and the computational power can be reduced, so that the power consumption of the computer can be reduced. Further, the surface of a workpiece processed by a CNC machine can be improved by the data conversion system or computer-executable program described above.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A tool-path generating system for reducing surface roughness of a workpiece to be processed by a computer numerical control (CNC) machine, comprising:
    an interface configured to receive computer-aided manufacturing (CAM) path data via a network;
    a memory configured to store a computer-executable program including a lower convex hull determining method for determining lower convex hull and a dynamic programing algorithm;
    a processor, in connection with the memory, configured to execute the computer-executable program, wherein the program causes the processor to perform steps comprising:
    providing a coordinate system including admissible points;
    forming, from the CAM path data, a target polyline on the coordinate system, wherein the target polyline represents an approximated surface line of an object;
    dividing the target polyline into line segments;
    generating a set of rational vectors by approximating slopes of the line segments based on the lower convex hull;
    arranging the rational vectors to form lower convex hull lines arranged on or above corresponding line segments, wherein the lower convex hull lines are arranged onto the admissible points, wherein the admissible points are on or above the corresponding line segments;
    selecting a set of endpoints of the lower convex hull lines; and
    generating a tool path data by merging the endpoints based on the dynamic programing algorithm, wherein the tool path data is arranged to lay on or above the target polyline, such that a tool motion of the CNC machine is controlled based on the tool path data along a surface of the object without gouging the surface of the object.

2. The system of claim 1, wherein the numerical precision of the CAM path data is higher than numerical precision of the admissible points.

3. The system of claim 1, wherein a subset of endpoints are sequenced into a polyline to minimize area between said polyline and the target polyline.

4. The system of claim 1, wherein the numerical precision of the CAM path data is determined based on a resolution of a computer aided manufacturing system.

5. The system of claim 1, further comprises an output interface to transmit the tool path data to the CNC machine.

6. The system of claim 1, wherein the admissible points are compatible with an internal coordinate system of the CNC machine.

7. The system of claim 1, wherein the dividing is performed based on a predetermined integer method.

8. The system of claim 1, wherein the CAM path data are transmitted from a computer-aided manufacturing system.

9. The system of claim 1, wherein the lower convex hull determining method is performed based on a Diophantine approximation method.

10. The system of claim 1, wherein another coordinate system is addable above the line segments.

11. The system of claim 1, wherein a both upper and lower convex hulls are filtered by dynamic programming to obtain a machine-coordinate tool path that has minimal undercuts and overcuts.

12. A computer-implemented method for generating tool path data for reducing surface roughness of a workpiece to be processed by a computer numerical control (CNC) machine, comprising steps:
    receiving computer-aided manufacturing (CAM) path data via a network;
    providing a coordinate system including admissible points;
        forming, from the CAM path data, a target polyline on the coordinate system, wherein the target polyline represents an approximated surface line of an object;
    dividing the target polyline into line segments;
    generating a set of rational vectors by approximating slopes of the line segments based on a lower convex hull determining method for determining lower convex hull;
    arranging the rational vectors to form lower convex hull lines arranged on or above corresponding line segments, wherein the lower convex hull lines are arranged onto the admissible points, wherein the admissible points are on or above the corresponding line segments;
    selecting a set of endpoints of the lower convex hull lines; and
    generating a tool path data by merging the endpoints based on the dynamic programing algorithm, wherein the tool path data is arranged to lay on or above the target polyline, such that a tool motion of the CNC machine is controlled based on the tool path data along a surface of the object without gouging the surface of the object.

13. The method of claim 12, wherein the numerical precision of the CAM path data is higher than numerical precision of the admissible points.

14. The method of claim 12, wherein a subset of endpoints are sequenced into a polyline to minimize area between said polyline and the target polyline.

15. The method of claim 12, wherein the numerical precision of the CAM path data is determined based on a resolution of a computer aided manufacturing system.

16. The method of claim 12, further comprises an output interface to transmit the tool path data to the CNC machine.

17. The method of claim 12, wherein the admissible points are compatible with an internal coordinate system of the CNC machine.

18. The method of claim 12, wherein the dividing is performed based on a predetermined integer method.

19. The method of claim 12, wherein the CAM path data are transmitted from a computer-aided manufacturing system.

20. The method of claim 12, wherein the lower convex hull determining method is performed based on a Diophantine approximation method.

21. The method of claim 12, wherein another coordinate system is addable above the line segments.

22. The method of claim 12, wherein a both upper and lower convex hulls are filtered by dynamic programming to obtain a machine-coordinate tool path that has minimal undercuts and overcuts.

* * * * *